United States Patent [19]
Ishikawa et al.

[11] 4,438,160
[45] Mar. 20, 1984

[54] METHOD OF MAKING A ROTARY BALL DISPLAY DEVICE

[75] Inventors: Reiji Ishikawa; Masaki Saito; Toshio Mori; Hidemasa Tamura, all of Kanagawa, Japan

[73] Assignee: Sony Corporation, Tokyo, Japan

[21] Appl. No.: 458,546

[22] Filed: Jan. 17, 1983

[30] Foreign Application Priority Data

Jan. 18, 1982 [JP] Japan .................................. 57-5806
Jan. 18, 1982 [JP] Japan .................................. 57-5807

[51] Int. Cl.³ .......................... G09G 3/00; B05D 7/00
[52] U.S. Cl. .................................. 427/214; 427/282; 427/336; 427/352; 340/815.08; 340/783
[58] Field of Search ............... 427/214, 282, 154, 352, 427/336; 428/325; 340/787, 788, 783, 815.08, 764; 264/DIG. 6; 523/228

[56] References Cited
U.S. PATENT DOCUMENTS 3,924,226 12/1975 Lacy et al. .......................... 340/336
4,126,854 11/1978 Sheridon ........................... 340/373

Primary Examiner—Michael R. Lusignan
Assistant Examiner—Ken Jaconetty
Attorney, Agent, or Firm—Hill, Van Santen, Steadman & Simpson

[57] ABSTRACT

A method for manufacturing rotary ball display devices wherein a plurality of such balls are provided with a coating of a color different from the remainder of the ball, the ball members are coated with a thin coating insoluble in the settling medium into which they are introduced, so that upon settling into a low viscosity liquid, they form a uniform layer. A high molecular weight hardenable coating material which is soluble in the low viscosity liquid is then poured onto the coated ball members to cover the layer. Then, the low viscosity liquid is removed and the hardenable coating material is caused to harden. The thin coating is then dissolved away from portions of the ball members to leave cavity portions thereabout into which a high resistivity liquid is introduced. The resulting ball members have a refractive index on the colored layer which is substantially the same as the refractive index of the high resistivity liquid contained in the cavities.

8 Claims, 13 Drawing Figures

METHOD OF MAKING A ROTARY BALL DISPLAY DEVICE

BACKGROUND OF THE INVENTION

1. Field of the Invention

This invention is in the field of manufacturing rotary ball display devices and in particular relates to a method for producing rotary ball display devices of improved quality.

2. Description of the Prior Art

Previously proposed rotary ball display devices included a number of display ball members in which one hemispherical surface of each ball was colored white and the other hemispherical surface was colored, for example, black by an insulating color layer. The spherical cavities were then filled with an organic liquid having a predetermined density and a high resistivity, for example, toluene and were supported so as to be freely rotatable. In this type of device, the nature of the organic liquid and the mutual charged condition of the different colored portions of the display ball members were made different so as to be opposite in polarity in the liquid. Accordingly, when an external electric field was applied to the display ball members in response to the material to be displayed, the predetermined colored side of the display ball member could be rotated toward the side of the viewer so as to make the desired display pattern.

Since the colored surface layer of the display ball member should be adherent to the ball it is considered advantageous that the color layer substance be an inorganic substance rather than an organic one. Inorganic coloring substances, however, generally have a considerably higher refractive index than the organic liquid. For example, the refractive index of toluene is about 1.49 while that of the blackish brown inorganic coloring substance antimony trisulfide ($Sb_2S_3$) is 3.0. Accordingly, if a rotary ball display device having a colored layer of such a high refractive index is supported in the organic liquid, an external light is reflected on an interface or boundary surface between the surface of the colored layer and the liquid, thereby inhibiting the formation of the required color display pattern. Consequently, a clear display with a high contrast cannot be obtained.

There have been previously proposed several methods for manufacturing the rotary ball display device with the aforementioned arrangement, particularly a display device which includes a display ball member together with an organic liquid. For example, it has been proposed to mix a number of display ball members into an elastomer, mold and harden the elastomer into the form of a sheet, and immerse this elastomer sheet into an organic solvent where it is swollen to provide cavities about the respective display ball members and producing a sheet shaped display member in which each of the cavities is filled with an organic liquid having high resistivity. However, it has been impossible to control the arrangement and packing density of the display ball members to a sufficiently high value so that a display of high quality, high resolution, and high contrast could not be achieved. Moreover, the display device of such an arrangement poses problems in connection with the selection of a usable organic liquid, stability upon changes in temperature, non-uniformity of dimensions of the cavities, and the like.

There have also been methods involving doctor blade application and slurry application to produce the ball member. The former technique requires strict adherence to critical conditions so that mass production capabilities are limited and the packing density of the ball members cannot be increased. The slurry method is inferior because it does not produce a sufficiently high packing density to achieve high definition display.

SUMMARY OF THE INVENTION

The present invention provides a method for manufacturing rotary ball display devices which obviate the aforementioned defects inherent in more conventional methods. In accordance with the present invention, a colored layer is specially arranged on the surface of a display ball member, the ball members are arranged at substantially high packing densities, and the display ball members can be supported so as to be rotatable within a fairly small space.

In accordance with the present invention, there is provided a method for manufacturing rotary ball display devices in which a number of ball members are provided each having a hemispherical surface having a color different from the remainder of the ball member, forming an accumulated layer of such ball members by settling them into a liquid having a low viscosity, each of the ball members having been precoated with a coating material which is insoluble in the settling liquid. A high molecular weight material which is soluble in the liquid is poured over the layer so as to cover the accumulated layer of ball members. The liquid is then removed and the high molecular weight material is hardened. The coating material is then dissolved from the ball members and the cavity portions which are thereby formed by the elimination of the coating material are filled with a liquid having high resistivity.

Other features and advantages of the present invention will be apparent from the following description taken in conjunction with the accompanying drawings.

DESCRIPTION OF THE PREFERRED EMBODIMENTS

An improved method for the manufacture of rotary ball display devices according to the present invention will be described in detail with reference to the attached drawings.

Figure 1:
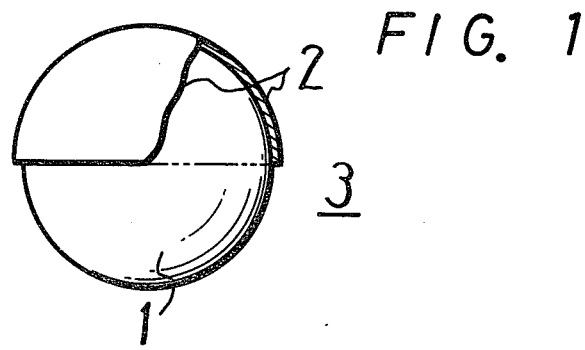
FIG. 1 is an enlarged view partly in cross section of a display ball member.

A rotary ball construction produced according to the present invention is illustrated in FIG. 1 and may consist of a white glass ball member 1 of about 50 microns in diameter which is covered on one part of its surface, for example, on one hemisphere with an insulating color layer 2, constituting, in combination, a display ball member 3. The color layer 2 has an improved construction which will now be described.

Figure 2:
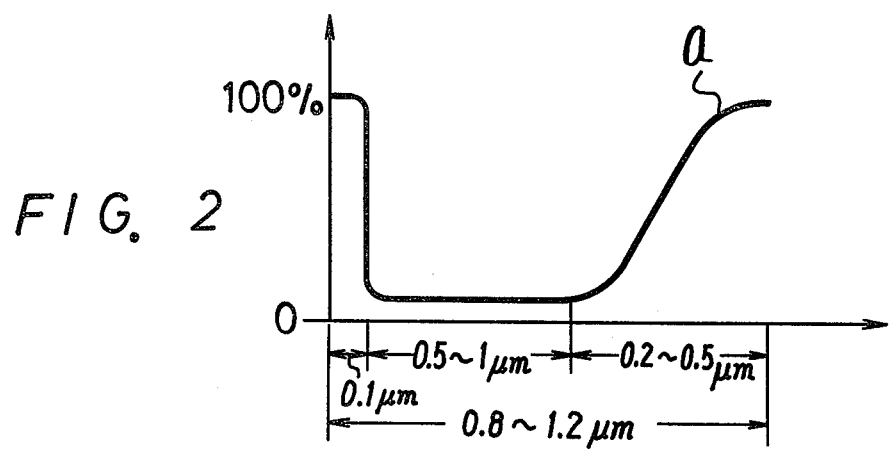
FIG. 2 is a distribution curve plotting the ratio of ingredients in the coloring layer provided on the ball member as a function of the thickness.

According to the present invention, the color 2 is formed of a composite film of a mixture or laminates of layers which are formed from an inorganic coloring substance having strong adhesive properties toward the glass ball member 1 such, for example, as the blackish brown coloring substance $Sb_2S_3$, and an inorganic substance having a low refractive index as compared with that of $Sb_2S_3$, for example, magnesium fluoride ($MgF_2$) or silicon monoxide or dioxide ($SiO$ or $SiO_2$). The concentration of the material having the low refractive index preferably varies from the interior to the exterior and predominates in the outer portion of the color layer 2 which comes in contact with the organic liquid such as toluene. Thus, at least the outer surface of the ball has a refractive index which is equal or close to that of toluene when that liquid is used as the organic liquid which supports the display ball member 3. If the inorganic substance which has a low refractive index possesses a strong adhesion to the ball member 1, the relative proportion of the material with low refractive index in the color layer may be increased on the underlayer side of the color layer 2 or on the side of the color layer to which the glass ball member is bonded. The color layer 2 itself in that instance may be formed of a single layer composed of the inorganic substance with a low refractive index. In other words, the distribution or proportioning of the inorganic substance having the low refractive index, for example, $MgF_2$, in the thickness direction of the color layer 2 may be represented by the curve a in the graph of FIG. 2. In this graph, the relative proportion of low refractive index material is plotted against the thickness of the color layer 2. From this graph, it will be seen that the proportion of the color substance is larger in the intermediate layer of the color layer between the two surfaces thereof. As indicated, the color layer 2 has a large proportion of inorganic substance with low refractive index on both its interior and exterior sides. The distribution or proportioning between the two materials can be made to increase gradually or step-by-step.

Figure 3:
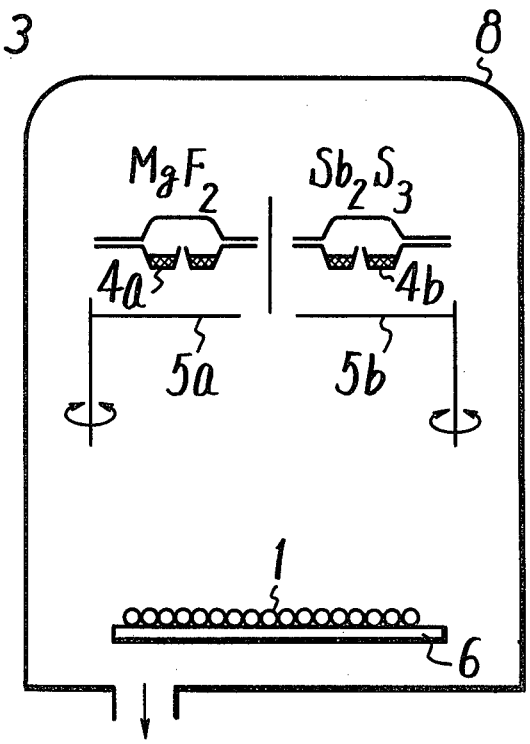
FIG. 3 is a schematic diagram illustrating apparatus for forming a color layer on the display ball member.

Next there will be described a method for forming the color layer 2. Such color layer can be formed by an evaporating apparatus as shown, for example, in FIG. 3. The evaporating apparatus comprises, for example, a vacuum bell jar 8, an evaporating source for evaporating an inorganic substance with a low refractive index, for example, $MgF_2$, identified at 4a and an evaporating source for the inorganic coloring substance, for example, $Sb_2S_3$, consisting of a second evaporating source 4b. Elements 5a and 5b respectively denote shutters or dampers for controlling by opening and closing the exposure of the articles to be coated to the first and second evaporating sources 4a and 4b.

Figure 4:
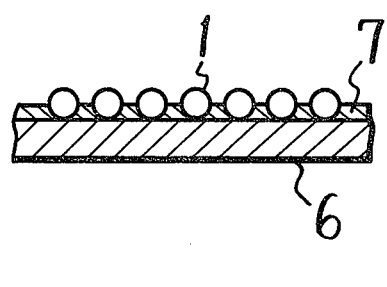
FIG. 4 is a fragmentary view on an enlarged scale of the ball members being coated.

Inside the bell jar 8 there are placed white glass ball members 1 on which the color layer 2 is to be deposited. As shown in FIG. 4, a number of white glass ball members 1 on which the color layer will be deposited can be disposed on a common base plate 6 which contains a viscous layer 7 in which the glass balls are partially immersed. While the glass balls are so confined, the color layer 2 is deposited on the exposed surfaces of the respective white glass ball members 1 by using the viscous layer 7 as a mask. For example, on the glass base member 6 there may be coated a heat resistant acrylic viscous layer 7 measured in tens of microns in thickness and a number of white glass ball members 1 each having a diameter of about 50 microns, arranged on the glass base member 6 as a single layer. The white glass ball members 1 may be scattered on the viscous layer 7 and subjected to a roller treatment by a silicon rubber roller or the like to a "Teflon" sheet, for example, of 50 microns in thickness so that the white glass ball members are pressed into the viscous layer so as to be partly buried therein to the depth of a hemisphere. Thereafter, the excess ball members, if any, which are not embedded in the viscous layer 7 are removed by a spray of high pressure gas, leaving the white glass ball members 1 bonded to the base member and arranged as a single layer. If the thickness of the viscous layer 7 is adjusted in accordance with the diameter of the white glass ball members 1, the depth at which the white glass ball members are immersed into the viscous layer can be established with high precision.

With the base member 6 introduced into the bell jar 8, with the exposed portions of the ball members facing the evaporation sources 4a and 4b, the inside of the bell jar 8 is exhausted, and the shutters 5a and 5b are opened and closed as required. The ball members 1 are thus provided with a preselected proportion and distribution of the coloring substances thereon. For example, initially only the $MgF_2$ can be evaporated under the surfaces of the balls for three minutes at an evaporation speed of about 0.1 micron/minute. During the middle of the evaporation period, the coloring substance $Sb_2S_3$ can be evaporated for thirty seconds at an evaporation speed of about 1 micron/minute, forming a color layer 2 of about 0.8 microns in total thickness.

After the evaporation, the base member 6 is immersed into a solvent for the viscous layer 7 such, for example, as ethanol whereupon the viscous layer 7 is swollen. At the same time, the ball members 1 may be brushed off by means of a brush or the like and released from the viscous layer 7. A number of display ball members 3 are thus simultaneously obtained in which the hemispherical portions of the ball members which were buried in the viscous layer 7 are not colored while the remaining portions of the ball members are colored by the colored films made from the selective evaporation of the two coloring materials as set forth above.

The display ball members 3 may be used in the form of sheets which may be constructed, for example, as follows.

Figure 5:
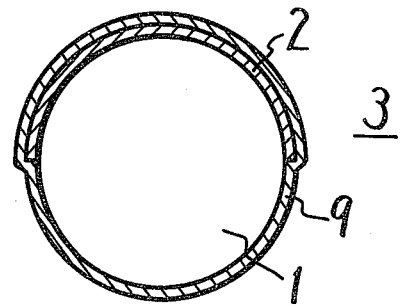
FIG. 5 is an enlarged cross-sectional view of a display ball member.

As shown in FIG. 5, each of the display ball members 3 is coated by means of a coating material 9 such as wax which is not soluble in the dispersing medium into which the coated ball members are introduced. Coating is, however, soluble in an organic solution such as toluene which has high electrical resistivity and is used as a suspending medium in the final display member.

The dispersion of the coated glass display members takes place in apparatus of the type shown in FIGS. 7 through 11. There is provided a water bath 10 composed of a double walled structure for example an internal wall structure 11 and an external wall structure 12, the latter having an entrance and/or discharge 13 for liquid. On the bottom of the inside wall structure 11 there is provided a flat bottom surface 15 on which a water repellent base plate or sheet 14 is located. At the periphery of the flat bottom surface 15 there is provided a ridge 16 having a height h which surrounds the same and provides an annular tank or reservoir 17. A first through-hole 18 is bored through the wall of the inner wall structure 11 at a position lower than the top of the ridge 16. If necessary, a second through-hole 19 is also bored through the inside wall 11 at a position slightly higher than the top of the ridge 16.

Figure 7:
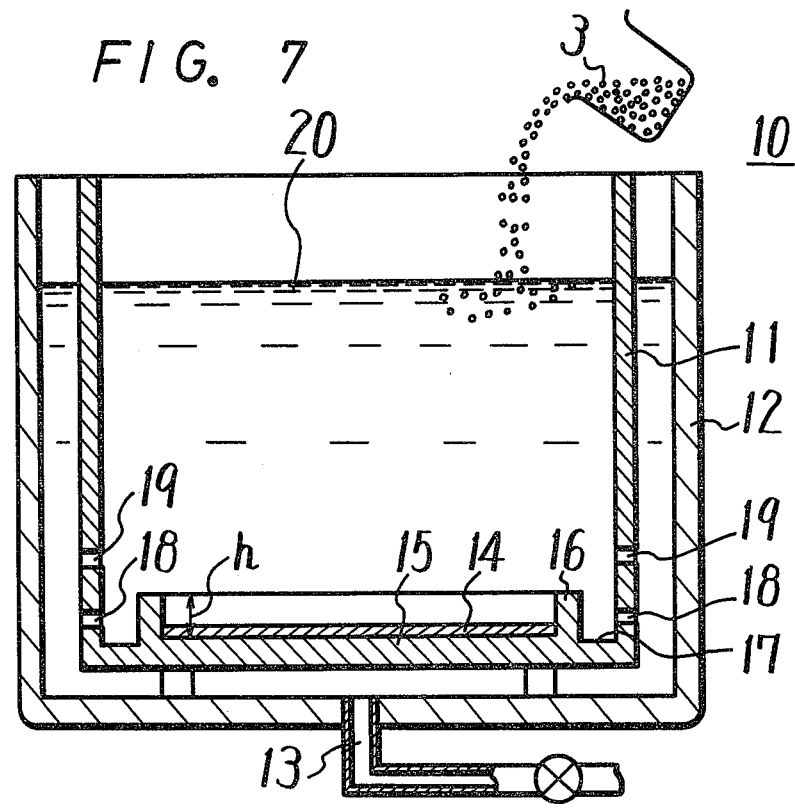
FIGS. 7 through 11, inclusive, are schematic cross-sectional diagrams used to explain the sequence of manufacturing steps according to the present invention.
Figure 8:
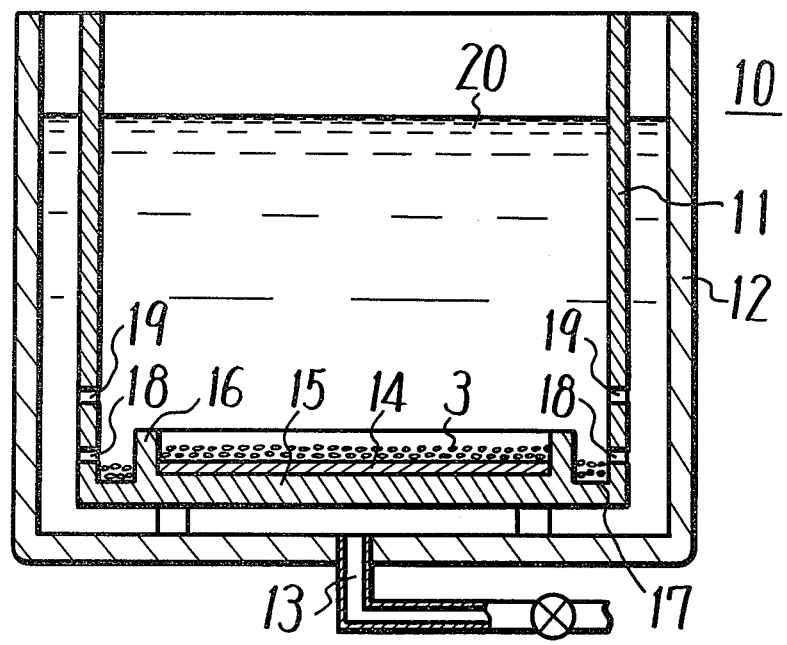

The still water bath 10 may be filled with water containing a neutral cleanser such as "EMULGEN" providing a liquid 20 having a low viscosity. The display ball members 3 each of which has been previously wax coated are dispersed through the liquid 20 as illustrated in FIG. 7 for settling therethrough. These display ball members 3 accumulate on the water repellent base plate or sheet 14 located on the bottom surface 15. The settling distance is sufficient to inhibit the quiescent solution from being disturbed by the dispersion and the settling of the display ball members 3 so that the ball members 3 are dispersed uniformly. Thus, the layer of display ball members 3 which accumulates on the bottom portion or surface 15 can be made uniform at a substantially high packing density. The conditions existing during settling are schematically illustrated in FIG. 8 of the drawings.

Figure 9:
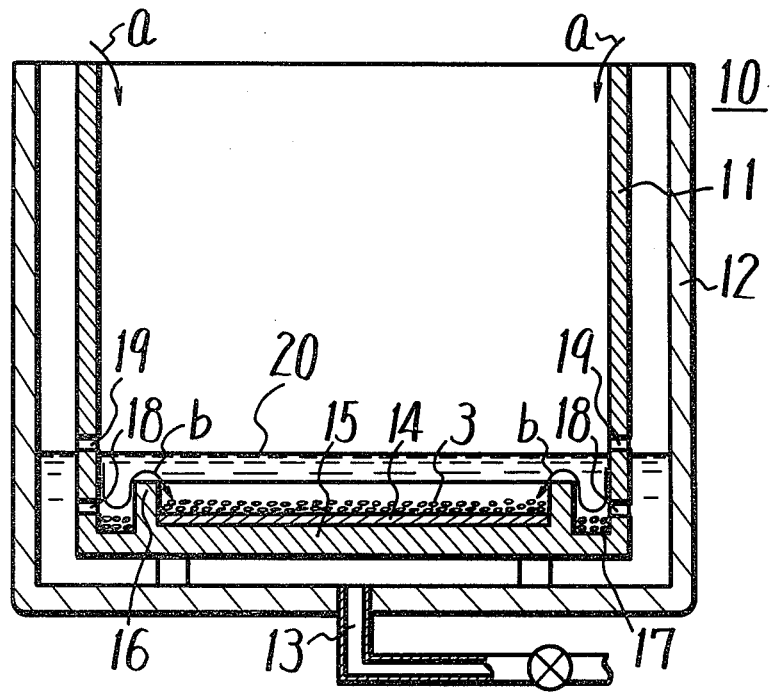
Figure 10:
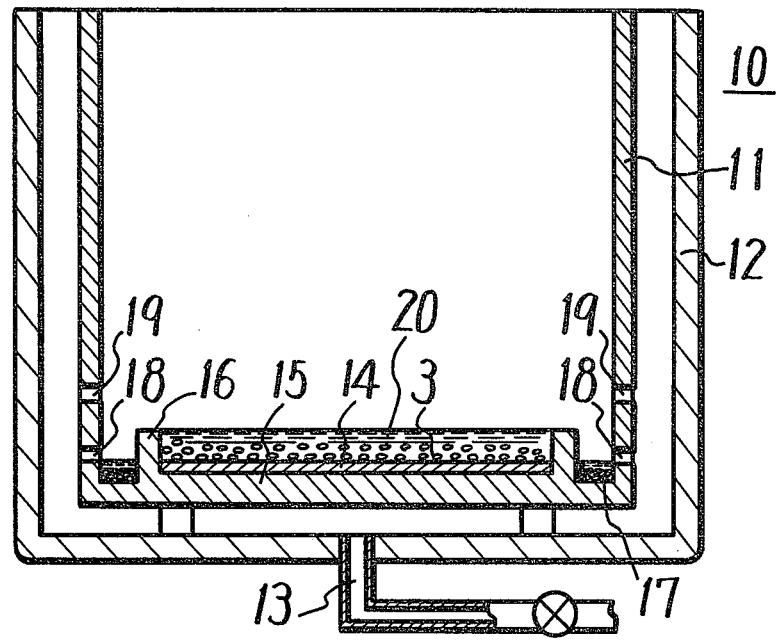
Figure 11:
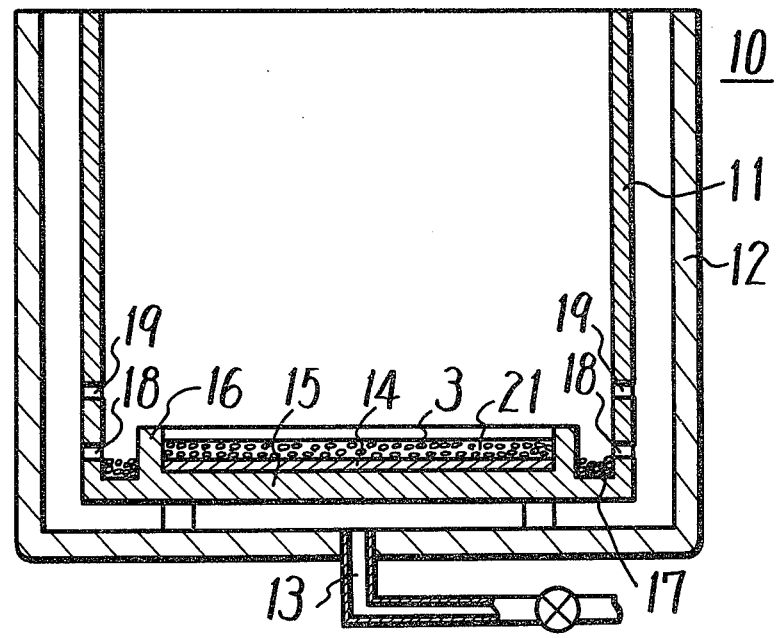

After the settling and accumulation of the ball members as shown in FIG. 9, most of the liquid 20 is withdrawn from the water bath 10 until the level of the liquid 20 reaches the position which is slightly above the level of the accumulated layer as, for example, the level of the second throughhole 19. When the liquid has been drained to this extent, there is introduced into the inner chamber a hardenable resinous composition such as a 5% aqueous solution of polyvinyl alcohol (PVA). The composition is introduced into the inner chamber along the inner wall surface as shown by the arrow a in FIG. 9 and then flows into the reservoir 17 formed around the bottom peripheral portion where it accumulates temporarily. As shown by arrow b, the PVA aqueous solution which overflows over the ridge 16 from the reservoir 17 flows into the bottom of the inside wall structure 11 surrounded by the ridge 16. Without substantially disturbing the accumulated state of the ball members 3, the overflowed PVA solution surrounds and envelops the accumulated layer of ball members 3 and permeates into the gaps existing between the individual ball members 3. Thereafter, the liquid 20 is withdrawn from the fluid discharge exit 13. In this way, as shown in FIG. 10, the liquid 20 is withdrawn from the inside wall structure 11, leaving an amount of liquid 20 defined by the height of the ridge 16. Thereafter, as shown in FIG. 11, the remaining liquid 20 is evaporated to harden the same and thereby produce a sheet 21 in which the layer of ball members 3 is surrounded by the PVA aqueous solution. The sheet 21 together with the aforementioned base plate or sheet 14 is taken out of the bath 10 and then dried, for example, by means of a tungsten lamp to harden the PVA.

Figure 12:
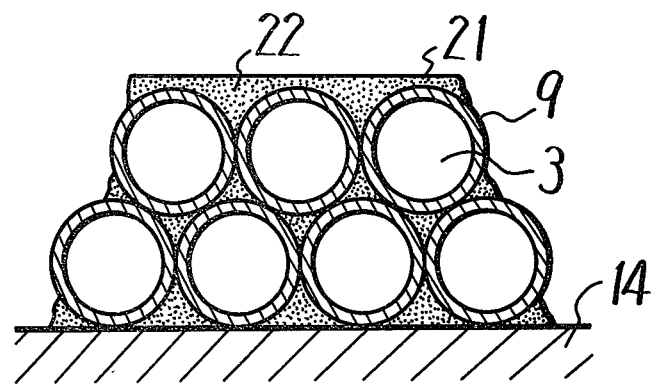
FIG. 12 is an enlarged fragmentary cross-sectional diagram showing a sheet type display member produced according to the present invention in an intermediate stage of its production.
Figure 13:
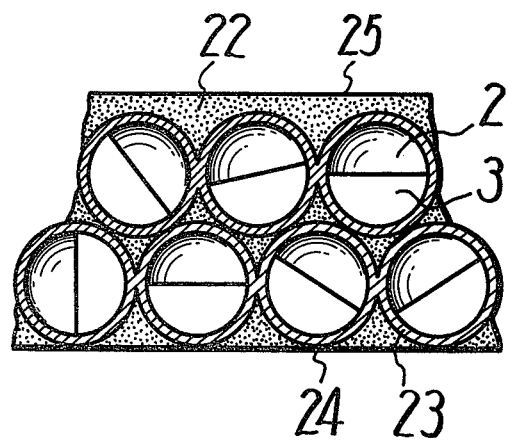
FIG. 13 is a view of a sheet member shown in FIG. 9 in its final state.

In the sheet 21 thus obtained, part of which is enlarged in the showing of FIG. 12, the ball members are arranged with a substantially high packing density while coated with the coating material such as the wax coating 9. In this condition, the gaps appearing between the ball members 3 are filled with high molecular weight (PVA) 22 so the material retains the shape of a sheet. Next, the sheet 21 is peeled off from the water repellent base plate or sheet 14 and the coating material 9 is washed away by an organic liquid such as toluene which has high resistivity. Due to the dissolution of the wax coating 9 about each of the ball members, cavities 23 of a dimension corresponding to the thickness of the coating material are produced, as illustrated in FIG. 13. The respective cavities 23 are connected with one another at their mutual contact points due to the high packing density therebetween as soon as the coating material 9 is removed from the ball members 3. These cavities 23 are then filled with toluene or other organic liquid having a high resistivity such liquid being shown at reference numeral 24.

A sheet type display member 25 can be obtained in which the display ball members 3 are rotatable by the interposition of the organic liquid 24 having high resistivity which fills the spherical cavities 23 with the highest packing density.

Figure 6:
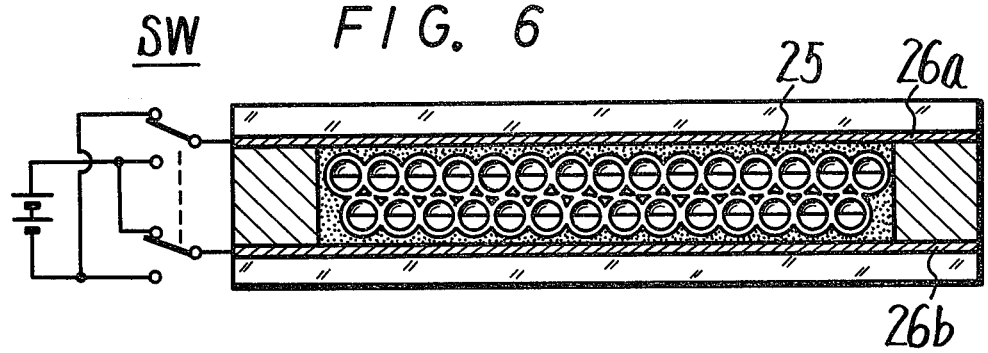
FIG. 6 is a cross-sectional view showing a sheet type rotary ball display apparatus which can be manufactured according to the method of the present invention.

As shown in FIG. 6, the sheet type display member 25 can be provided on both of its surfaces with electrode plates 26a and 26b at least one of which is a transparent electrode, arranged with predetermined patterns and a voltage with the polarity corresponding to the content to be displayed is applied through a changeover switching circuit SW across both the electrodes 26a and 26b. The arrangement described thus functions as a desirable rotary ball display device.

In the device formed by the manufacturing method of the present invention, since the display ball member is coated with a color layer whose refractive index is low and is equivalent to or approximately the same as that of the organic liquid surrounding the display ball member, and the refractive index of the color layer increases gradually or step-wise toward the middle, reflections on an optical boundary due to the difference of refractive indices at the boundary between the liquid and the surface of the color layer can be reduced and hence the display can be made with higher contrast.

Since the color layer 2 of the display ball member 1 is formed of a complex film even when its adhesion to the glass ball is not satisfactory, the strength of adhesion can be increased by employing substances with a large adhesive strength toward the glass ball member such as $MgF_2$, $SiO$ and $SiO_2$ and by increasing the concentration of the material with a low refractive index as required.

The coloring substance of the color layer 2 is not limited to the aforementioned $Sb_2S_3$, but amorphous silicon and the like can also be utilized.

In the above-described method, it is preferable to use a PVA aqueous solution at a concentration of 2 to 10 weight % and preferably from 5 to 7 weight % because solutions with the aforementioned concentrations provide a suitable viscosity so that the entire deposited layer can be covered by the PVA aqueous solution without disturbing the layer of ball members 3. If the concentration of the PVA aqueous solution is too low, it takes excess time to dry the layer.

In the settling of the ball members 3, for example, the bottom surface 15 of the bath can be heated to permit the still water in the bath to flow upwardly to some extent. Alternatively, the bottom surface can be suitably vibrated so that the accumulation of ball members 3 can be made with higher density.

Furthermore, while in the embodiment described, the water bath 10 is of a double-walled structure, the arrangement of the water bath is not limited to such structure but various modifications such as a single wall structure can be used.

The display device of the present invention provides a display with high contrast and which is stable for a long period of time. Since the display ball members can easily be arranged with a high packing density, a display with high definition can be made and a display device with a large display area can be mass produced.

The above description is directed to a single preferred embodiment of the invention but it will be understood that many modifications and variations can be effected by one skilled in the art without departing from the spirit or scope of the novel concepts of the invention, and that the scope of the invention should be determined by the appended claims only.

We claim as our invention:

1. A method of making a rotary ball display device which comprises:
   providing a plurality of ball members each having a hemispherical surface of a color different than the other hemispherical surface thereof,
   coating said ball members with a thin coating,
   settling the coated ball members into a low viscosity liquid to form a layer of coated ball members, said thin coating being insoluble in said low viscosity liquid,
   pouring a high molecular weight hardenable coating material soluble in said low viscosity liquid into said coated ball members to cover said layer,
   removing said low viscosity liquid,
   hardening said hardenable coating material,
   dissolving away said thin coating from said ball members to leave cavity portions thereabout, and
   introducing a high resistivity liquid into said cavity portions.

2. A method according to claim 1 in which:
   each ball member consists of a white glass ball coated on a hemispherical portion thereof with an inorganic coloring layer.

3. A method according to claim 2 in which:
   the refractive index of the surface of said coloring layer is substantially the same as that of said high resistivity liquid.

4. A method according to claim 3 in which:
   the coloring layer is a composite film of at least two inorganic coloring substances.

5. A method according to claim 1 in which:
   said ball members are provided by partially embedding the ball members in a viscous layer and
   depositing a coloring substance on the exposed surfaces of said ball members.

6. A method according to claim 5 in which:
   said coloring substance is deposited by evaporation.

7. A method according to claim 6 in which:
   said coloring substance is deposited by selective evaporating from two sources of coloring substances to provide a composite film.

8. A method according to claim 7 in which:
   one of said coloring substances is $MgF_2$ and the other is $Sb_2S_3$.

* * * * *